June 10, 1924.  1,496,930
W. H. FLOOD ET AL
WELDING ELECTRODE AND METHOD OF MAKING SAME
Filed Feb. 7, 1922
Fig-1
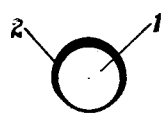   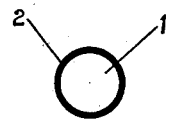
Fig-2   Fig-3
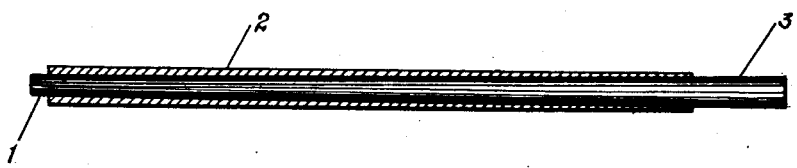
Fig-4
INVENTOR
WALTER H. FLOOD
&
BY DONALD T. SMOUT
A. D. T. Libby
ATTORNEY Patented June 10, 1924.

1,496,930

UNITED STATES PATENT OFFICE.

WALTER HERBERT FLOOD, OF TOOTING, AND DONALD TRENTHAM SMOUT, OF WEST DULWICH, LONDON, ENGLAND, ASSIGNORS TO ELECTRIC ARC CUTTING & WELDING COMPANY, OF NEWARK, NEW JERSEY.

WELDING ELECTRODE AND METHOD OF MAKING SAME.

Application filed February 7, 1922. Serial No. 534,806.

*To all whom it may concern:*

Be it known that we, WALTER HERBERT FLOOD and DONALD TRENTHAM SMOUT, subjects of the King of Great Britain, residing at 56 Lucien Road, Tooting, London, and 175 Clive Road, West Dulwich, London, respectively, have invented certain new and useful Improvements in Welding Electrodes and Methods of Making Same, of which the following is a specification.

This invention relates to an electrode particularly adapted for electric arc welding, cutting and the like. It is well known in the art of electric arc welding that the temperature of the electrode either at the arc or in close proximity thereto is an important factor in the efficient and proper deposition of the weld metal. For example, if the electric current is adjusted to produce a good weld in the beginning of the welding operation, as the work proceeds, the temperature of the wire gradually increases according to the $C^2 R$ losses in the welding electrode and the latter becomes overheated, with the result that owing to several reasons, such as excessive oxidation and splashing, the metal deposited toward the end of the operation is burned and the weld is of inferior quality.

We have found that one of the said above drawbacks is due to the fact that the welding electrodes heretofore used have been made of metal having a substantially uniform cross-section area throughout their length and our present invention consists in making the welding electrode of increasing cross-section toward the electrode holder and whereby the effect of increasing temperature, hereinabove referred to, is counteracted, so that the temperature of the wire is more nearly maintained constant throughout the whole welding operation.

Our investigations further indicate that the maintenance of the welding electrode at as nearly a constant temperature as possible, is also important from another point of view and that is, we have found that in order to perform the electric welding efficiently, the electrode should be hotter at its center than at the outer surface, as this tends to set up the formation of a molten globule contained in a solid electrode metal crater at the end of the wire, the metal deposited being transferred across the arc, chiefly in very small particles, by the generation of gas in the tip of the electrode. This leads us to the conclusion that for efficient welding this solid crater should be as well defined as possible during the whole welding operation, and that consequently the temperature of the solid metal of the electrode as it gradually reaches the arc, is an important factor, hence a number of advantages are derived from the use of a tapered electrode. Some of these advantages are enumerated as follows:

First: A higher current density is obtained at the starting end of the electrode which quickly raises its temperature and makes easier starting of the arc. This is highly advantageous in difficult places, such as encountered in corners and overhead welding.

Second: The right amount of heat at the arc in the beginning can be obtained without overheating the electrode farther up toward the handle.

Third: As the work gets hotter, more metal can be deposited and this is supplied by the increasing size of the electrode as the same is melted down into the work, the arc becoming less concentrated and the rate of deposit becoming somewhat greater. This may be called "mass" action; that is to say, as the work gets hotter, more metal is added by the increasing size of electrode, thereby tending to reduce the temperature of the work; or in other words, as the work tends to get hotter, the greater amount of metal added, tends to reduce the temperature with the general result of approaching a more uniform temperature.

Fourth: Up to the present time it has been customary for many welders, when commencing to deposit metal in order to form a joint between two pieces, to start the operation a short distance away from the actual spot where the joint should commence. This is done for the reason that when commencing the operation, the electrode metal and the work metal are cold and it is necessary for the arc to be in operation a short period of time before a sufficiently large puddle has been formed in the metal of the work to accommodate the metal deposited from the electrode. We have found that by using a tapered electrode as herein described, this bad condition is eliminated, which may be explained by the fact that when the tapered electrode is used, the arc is concentrated over a smaller area of work than it is in a case where the tip of the electrode ends in a larger cross-sectional area.

Further advantages will be apparent to one skilled in the art after a study of this specification and the drawing annexed thereto.

To illustrate our invention we have shown in—

Figure 1 a diagrammatic illustration of our tapered electrode;

Figure 2 is a sectional view of an electrode having a partial coating. By partial coating we mean one which extends only a part of the way around the periphery of the electrode throughout a greater part of the length. There is a bare side throughout the length of the rod for assisting in striking an arc.

In Figure 3 we have shown an electrode having a coating all the way around its periphery;

While in Figure 4 we have shown our tapered electrode having a tapered covering.

In the drawings, 1 illustrates a metal portion of the electrode and 2 represents the covering when such covering is used.

In Figure 4 the tapered covering is preferably left bare at one end for the purpose of striking the arc, while at the other end 3 it is left bare for a distance sufficient to attach the welding handle thereto. The advantages of a tapered coating on an electrode of uniform cross-sectional area are well set forth in patent application S. N. 344,646 filed December 13, 1919 by Claude J. Holslag, but when this tapered covering is used with our tapered electrode, still greater advantages are obtained, for this additional thicker coating at the small end of the electrode raises the potential across the arc and this increase in the potential together with the greater heating of the electrode due to the smaller cross section, increases the ease of starting the arc.

Our tapered electrode may be manufactured by rolling or swaging or by electrically heating a length of wire secured by suitable clamps at the ends and then pulling the wire which causes the same to taper from the center toward the ends on account of the center getting the hottest. After the wire has been thus stretched it is cut in two, thus forming two electrodes. This latter process produces annealed electrodes which are advantageous for certain classes of work; while the swaging process produces electrodes having the outer skin harder than the interior, which has certain advantages in that the outer hard skin has an effect similar to a coating; that is to say, it serves to help direct the molten metal toward the proper point in the work; in other words, a squirting action is obtained.

Our invention is, of course, clearly applicable to bare electrodes as well as those being wholly or partially covered with flux or other types of coatings. Also the degree of taper of the electrode may be varied to suit conditions and we, therefore, do not wish to be limited to any definite degree of taper or to any kind of a coating to be used on the electrode.

Having thus described our invention, what we claim is:

1. A welding electrode consisting of a metal rod larger at one end than at the other.

2. A welding electrode consisting of a metal rod having a substantially uniform taper from end to end.

3. A welding electrode consisting of a metal rod having an appreciable taper from one end to the other.

4. An electrode for electric arc cutting and welding comprising a rod of current conducting material having the surface of the conducting material tapering from a part to be engaged by a holder to the arc end.

5. An electrode for electric arc cutting and welding comprising a rod of current conducting material having the conducting material smaller at the arc end than at the part to be engaged by an electrode holder.

6. An electrode for electric arc welding and cutting, having a body portion smaller at the arc end than at the holder end, and a coating thicker at the smaller end of the electrode and thinner at the larger end thereof.

7. A welding electrode consisting of a metal rod having a body portion tapering from one end to the other and a coating tapering in thickness in inverse order from said body portion of the rod.

8. An electrode, for electric arc welding and cutting, having a body portion smaller at the arc end than at the holder end, and a partial coating thicker at the smaller end of the electrode and thinner at the larger end thereof.

9. A welding electrode consisting of a metal rod having a body portion tapering from one end to the other and a partial coating tapering in thickness in inverse order from said body portion of the rod.

10. In an electric arc cutting and welding system, means for obtaining a higher current density at starting of the arc, including an electrode of current conducting material smaller in cross section at the arc end and gradually increasing in cross section toward the part engaged by an electrode holder.

11. In an electric arc cutting and welding system, means for obtaining the proper heat at the arc without overheating the electrode toward its holder, including an electrode of current conducting material smaller in cross section at the arc end and gradually increasing in cross section toward the part engaged by an electrode holder.

12. In an electric arc welding system, means for increasing the metal deposited as the work gets hotter, including an electrode of current conducting material smaller in cross section at the arc end and gradually increasing in cross section toward the part engaged by an electrode holder.

13. In an electric arc welding system, means for concentrating the arc at starting, including an electrode of current conducting material smaller in cross section at the arc end and gradually increasing in cross section toward the part engaged by an electrode holder.

14. In an electric arc welding system, means tending to effect easy starting of the arc, including an electrode of current conducting material smaller in cross section at the arc end and gradually increasing in cross section toward the part engaged by an electrode holder.

In testimony whereof, we have hereunto set our signatures this 16th day of January, 1922.

WALTER HERBERT FLOOD.
DONALD TRENTHAM SMOUT.